United States Patent [19]

Château

[11] 4,112,887

[45] Sep. 12, 1978

[54] AUTOMATIC SPARK TIMING DEVICE

[75] Inventor: Louis Jean Château, Rosny sur Bois, France

[73] Assignee: Ducellier et Co., Paris, France

[21] Appl. No.: 599,338

[22] Filed: Jul. 28, 1975

[30] Foreign Application Priority Data

Jul. 31, 1974 [FR] France .................... 74 26581
Dec. 27, 1974 [FR] France .................... 74 42950

[51] Int. Cl.² .................................. F02P 5/04
[52] U.S. Cl. ................................. 123/117 D
[58] Field of Search ............ 123/117 D, 117 R, 148 E

[56] References Cited

U.S. PATENT DOCUMENTS

| | | | |
|---|---|---|---|
| 3,738,339 | 6/1973 | Huntzinger | 123/117 R |
| 3,749,073 | 7/1973 | Asplund | 123/117 R |
| 3,752,139 | 8/1973 | Asplund | 123/117 R |
| 3,757,755 | 9/1973 | Carner | 123/117 R |
| 3,853,103 | 12/1974 | Wahl | 123/117 R |
| 3,923,021 | 12/1975 | Stark | 123/117 R |
| 3,941,103 | 3/1976 | Hartig | 123/117 R |
| 3,943,898 | 3/1976 | Kiencke | 123/117 R |
| 3,976,043 | 8/1976 | Canup | 123/117 R |

*Primary Examiner*—Ronald B. Cox

[57] ABSTRACT

A digital control device for an internal combustion engine ignition system includes a shaft angle digital encoder, a shaft speed digital encoder, a matrix memory addressed by the speed digital encoder and programmed to produce a digital output representing the required ignition angle for each speed value, a comparator connected to the angle encoder and the matrix to produce an output pulse when the digital signals therefrom coincide and means controlled by the angle encoder, the matrix memory device and the comparator for determining the shaft angles at which current flow through the ignition coil is initiated and terminated.

2 Claims, 14 Drawing Figures

FIG.1

_FIG. 2_

_FIG. 3_

_FIG.6_

_FIG. 9_

_FIG. 13_

FIG. 14

AUTOMATIC SPARK TIMING DEVICE

The present invention concerns an automatic ignition advance device for an internal combustion engine, particularly for motor vehicles, the device being of the type comprising an angular coder which delivers pulses converted into a coded number A as a function of the angular spacing α, which number A is applied to a first input of a comparator and of a tachometric generator which delivers a coded number B as a function of the speed of rotation of the engine, the number B being applied to a second input of the comparator, which delivers a control pulse to an ignition device when the coded number A coincides with the coded number B.

Such an automatic advance device is known from French Pat. No. 71.41135 and its certificate of addition No. 72.28268, in which are described automatic advance devices for carrying out a process characterised particularly in that a relationship is established, by a linear or non-linear law according to the law of advance required, between, on the one hand, the angular spacing α between a reference position taken on the engine flywheel and a variable position of the said flywheel and a coded number A and, on the other hand, the speed of rotation of the engine and another coded number B in such a manner that, the number A varying with the angular spacing from the given reference position and the number B being of a value determined as a function of the speed, when A coincides with B, there is obtained an ignition pulse which triggers the ignition spark, at this instant, which gives a relation, by means of the coded numbers A and B, between the angular spacing and the number of revolutions of the engine, which is caused to correspond to that given by the desired advance curve.

The angular coder according to the aforesaid Patent and its certificate of addition, is either of the type delivering 360 information signals per revolution, so as to give one pulse for each degree, the information signals being obtained by a perforated disc or one having conductive tracks, or of the type including a rotatable notched disc associated with a sensor providing a signal used by a tachometric generator which delivers a current proportional to the speed of rotation of the disc, this current feeding a relaxation oscillator which provides pulses proportional to the speed of rotation.

Although these coders function in a satisfactory manner, the first type being sensitive and difficult to set up are consequently relatively expensive, and the second type has the disadvantage of only functioning from a certain speed (about 200 revs/min with conventional transistors) and moreover the tachometric generator must also be as linear as possible and capable of a large range of frequencies.

These devices moreover necessitate defining thresholds and slopes which results in the requirement for a computer comprising a discriminator in which are programmed the thresholds and the advance curve and secondary discriminators in which are programmed the slopes of the ignition curve. Such a computer limits the advance curves to use of a high frequency oscillator necessitates the employment of rapid logic circuits of relatively high cost.

In order to avoid these disadvantages, the Applicant disclosed in Application No. 72.28268 a tachometric generator comprising, among other elements, matrix systems programmed according to the required law of advance, in such a manner that they transform the number from the bistables of the tachometric generator into a coded number B.

The devices described in the aforesaid applications, although ensuring correctly the control of the ignition timing, do not take into account the consumption by the ignition coil which is very high, especially at low engine speeds.

A first object of the present invention is to remedy the disadvantage of using an angular coder of relatively high cost and concerns, to this effect, a device for ignition advance, as a function of the speed of rotation of an internal combustion engine, characterised particularly in that it includes a rotatable element which, associated with a position detector, delivers a rectangular reference signal of constant width, a constant frequency pulse generator, a reference signal inverter, a first counter which, controlled by a monostable device, counts the number N1 of pulses from the pulse generator during one of the states of the reference signal and which, by means of a first logic element, memorises the number N1 during the other state of the reference signal, a binary divider which divides the number by another number N2 in order to obtain a number N3, a second counter which, by means of the inverter and a second logic element, counts the pulses from the pulse generator during the other state of the reference signal, a comparator of the number of pulses counted by the second counter and the number N3 issued by the binary divider in a manner such that when these two numbers are equal, there is obtained at the output of the comparator a pulse corresponding to a determined value of spacing with respect to the previous pulse, which pulse is applied on the one hand to the second counter in order to effect its return to zero and, on the other hand, with or without the use of a code converter, to one of the inputs of the comparator triggering the ignition signal when the value A coincides with the value B.

A second object of the present invention is to remedy the disadvantage of being unable to control the charge time of the ignition coil and concerns, to this effect, a device for automatic ignition advance as a function of the engine speed according to Claims 2 of the Applications No. 71.41135 and No. 72.28268, characterised in that it includes means which use the signals from the angular coder, the binary number from the comparator and that arriving at the matrix systems of the automatic advance in such a way as to control on the one hand, the curve of the desired ignition advance and, on the other hand, the charge time of the ignition coil of the ignition device.

The description which follows with reference to the attached drawings, given by way of non-limitative example, will facilitate a better understanding of how the invention can be carried out.

The term "asymmetric" designates an engine of which the ignition cycle is irregularly divided, in order to produce alternately two consecutive sparks separated by a different ignition angle and it is known that in this kind of engine, the ignition of one of the cylinders does not correspond to another cylinder in exhausting state.

Figure 1:
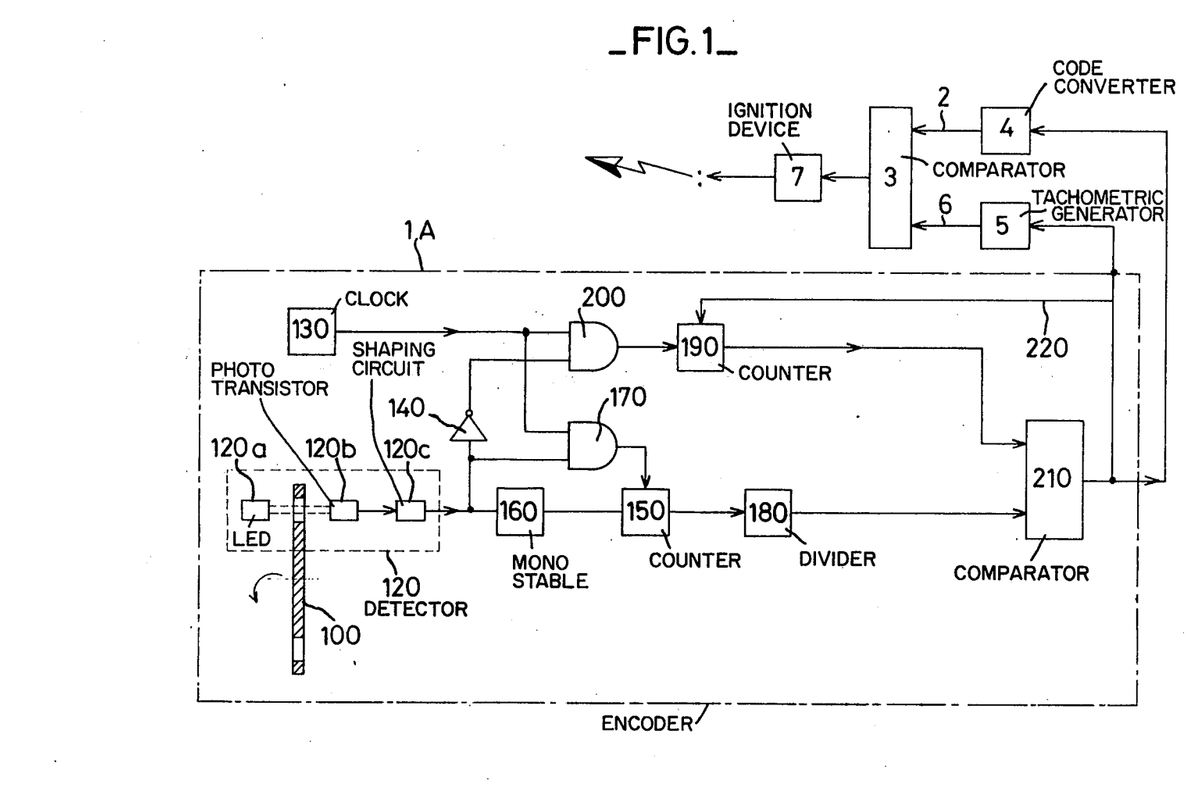
FIG. 1 shows schematically a first embodiment of the invention, particularly adapted to an internal combustion engine of the asymmetric multi-cylinder type.
Figure 2:
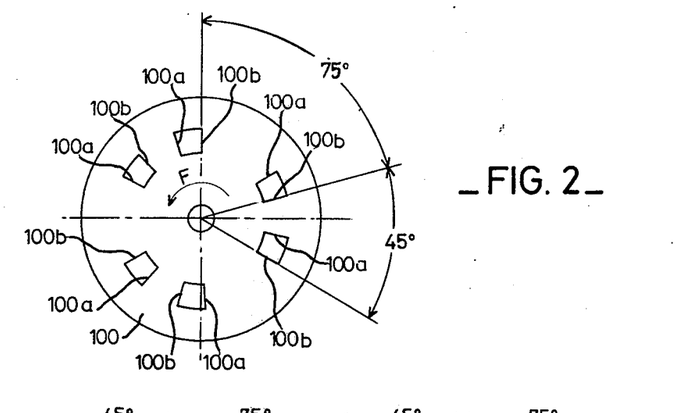
FIG. 2 is a schematic view of one embodiment of the rotatable element associated with the device of FIG. 1.

In a first embodiment, adapted more particularly to a six cylinder asymmetric engine, the angular coder 1A includes a disc 100 (FIGS. 1 and 2) driven, in the direction of the arrow F (FIG. 2) at half the speed of the internal combustion engine (not shown). The disc 100 is provided with six openings, angularly spaced from each other alternately by 75° and 45°. The angular width of the openings, identical for all the openings, corresponds to the desired variation of advance, which variation is determined by the side 100a for maximum advance and 100b for minimum advance (FIG. 2).

A position detector 120 composed, in known manner, of an electro-luminescent diode 120a, a photo transistor 120b and a shaping circuit 120c, delivers a reference signal of rectangular form, of constant width and of duration t proportional to the speed of rotation of the disc.

A generator 130 delivers pulses of constant frequency from the time that the device is supplied with voltage.

An inverter 140 connected to the output of the position detector 120, inverts the reference signal delivered by the position detector 120.

A first counter 150, of which the commencement of counting is controlled by the descending front of a monostable device 160, counts the number N1 of pulses from the constant frequency pulse generator 130 during the state 1 (FIG. 3) of the reference signal.

The number N1 of pulses is memorised in the counter during the state 0 of the reference signal, by means of an AND gate 170, of which one of the inputs is connected to the output of the position detector 120 and of which the other input is connected to the output of the generator 130. The return to zero of the counter 150 is effected by the ascending front of the monostable device 160.

A binary divider 180 divides the number N1 of pulses memorised by the counter 150, by a number N2, in order to provide at the output of this divider a number N3 corresponding to 1°.

In this embodiment, the number N2 corresponds to the angular width, expressed in degrees, of the openings formed in the disc, that is to say 32°, but it is well understood that if the required definition were to be 0.1°, the binary divider 180 would have to divide by 320.

A second counter 190 counts, by means of an AND gate 200 the pulses from the generator 130 during the state 0 of the reference signal coming from the position detector 120. The commencement of counting is controlled by the ascending front of the signal from the inverter 140, which front corresponds to the descending front of the signal coming from the detector 120.

A comparator 210 compares the number of pulses counted by the counter 190 and the number N3 coming from the binary divider 180, in such a manner that when these two numbers are equal, there is obtained at the output of the comparator 210, a displacement pulse of 1° with respect to the preceding pulse.

Figure 3:
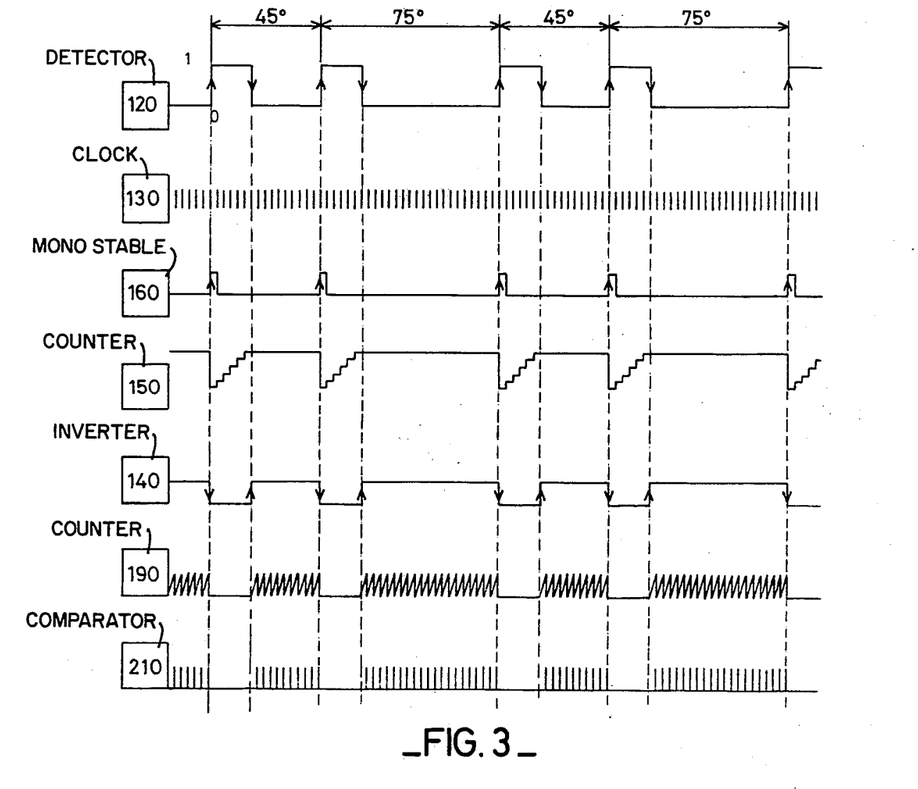
FIG. 3 shows the analogue form of the functions obtained by the device of FIG. 1 for a constant speed.

This displacement pulse effects, by means of the connection 220, the return to zero of the counter 190, and the cycle of counting and return to zero thus recommences from the descending front blocking the counter to the appearance of the ascending front (FIG. 3).

The pulse from the comparator 210 is applied to the input of the tachometric generator 5 which, as stated in the Application No. 71.41135, includes among other elements a computer which enables the desired ignition advance to be programmed.

At the output of the tachometric generator 5, there is thus obtained, as a function of the speed of rotation, the coded number B which is applied to the input 6 of the comparator 3.

The pulse from the comparator 210, converted into a coded number A, with or without the aid of the code converter 4, is applied to the input 2 of the comparator 3, which then delivers a control pulse to the ignition device 7 when the coded number A coincides with the coded number B.

Figure 4:
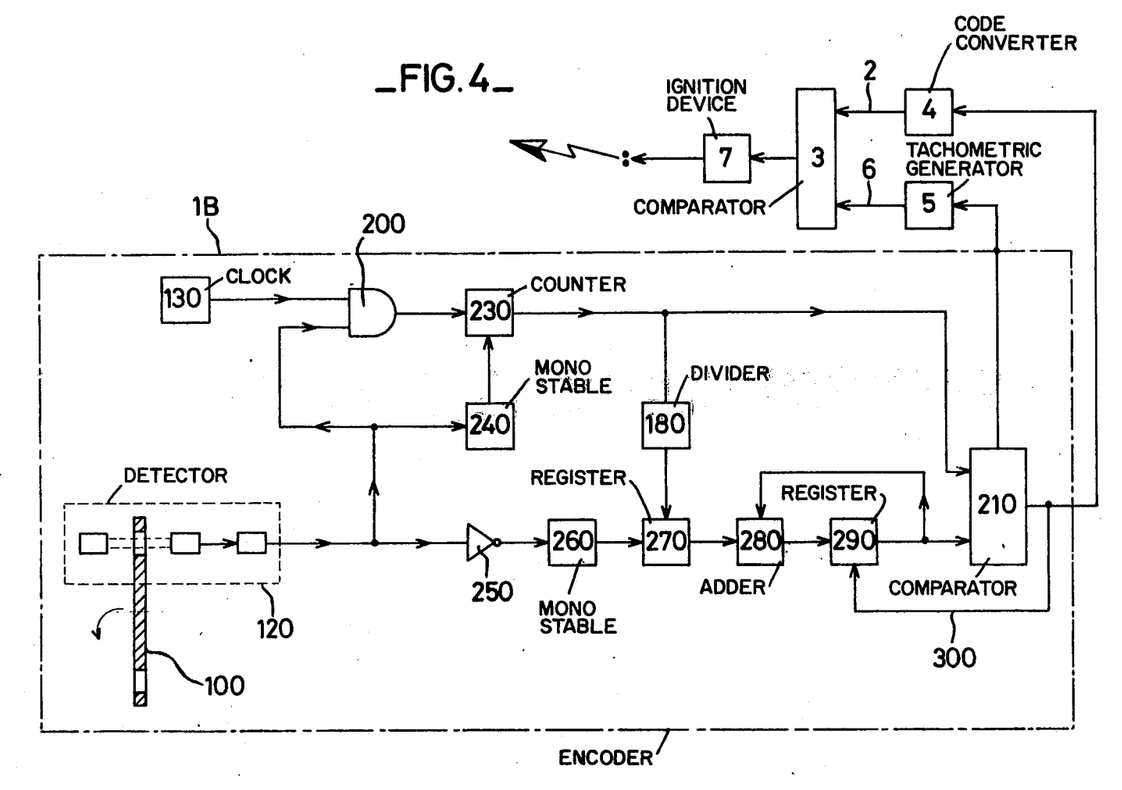
FIG. 4 shows schematically a second embodiment adapted also to an asymmetric engine.
Figure 5:
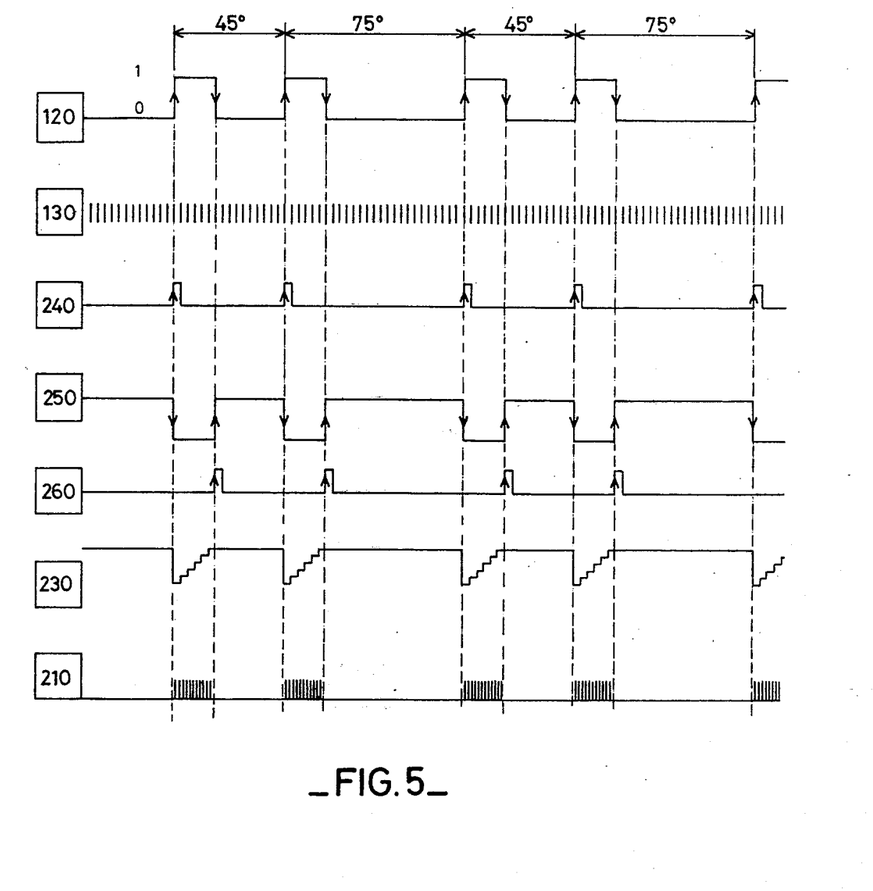
FIG. 5 shows the analogue form of the functions obtained by the device of FIG. 4 for a constant speed.

FIG. 4 represents schematically a second embodiment of the angular coder, also adapted to an asymmetrical engine, in which embodiment a counter 230 counts, by means of the AND gate 200, the number N1 of pulses from the generator 130 during the state 1 of the reference signal from the detector 120 (see FIG. 5). A first monostable device 240 controls the commencement of counting by its descending front. An inverter 250 of the reference signal from the detector 120 triggers a second monostable device 260 by the ascending front of its signal, the ascending front of the second monostable controlling the finish of counting of the counter 230. The binary divider 180 divides the number N1 from the counter 230 by a number N2, which in this example is also 32 as in the first embodiment, so as to provide at the output of this divider a number N3 corresponding to 1°. A first memory register 270, controlled by the descending front of the monostable 260, memorises the number N3 coming from the divider 180 during the state 1 of the monostable 260. An adder 280 adds the number N3 from the memory register 270 and the number taken from the output of a second memory register 290 so as to form another number which is applied to one of the inputs of the comparator 210 which compares the number N1 from the counter and the number from the memory register 190 in such a manner that when these two numbers coincide, the comparator delivers at its output a pulse corresponding to 1° of displacement with respect to the preceding pulse.

This displacement pulse causes, by means of the connection 300, the recordal in the memory register 290 of the number from the adder 280. There is thus obtained, by successive counting cycles, a displacement pulse with respect to the preceding pulse and this occurs during the part corresponding to the state 1 of the signal from the position detector 120.

As soon as the counter 230 commences counting, there is obtained a pulse at the output of the comparator 210 corresponding to 1° of displacement, when the number N3 previously memorised in the memory register 270 coincides with the number N1 from the counter 230.

On the occurrence of this pulse, there is stored in the memory register 290 the number from the adder 280, i.e. N3 + N3, which number corresponds to the second degree of displacement. The second pulse at the output of the comparator 210 will occur when the counter 230 delivers the same number as that present in the memory register 290, i.e. 2N3. There will then appear in the memory register 290 the number of pulses corresponding to the third degree of displacement, i.e. 3N3, and this will continue until 32N3 for the required 32° of displacement.

The advantage of this embodiment is that the adder 280 functions in a loop circuit in such a manner as to avoid the cumulative errors due to interference.

Figure 6:
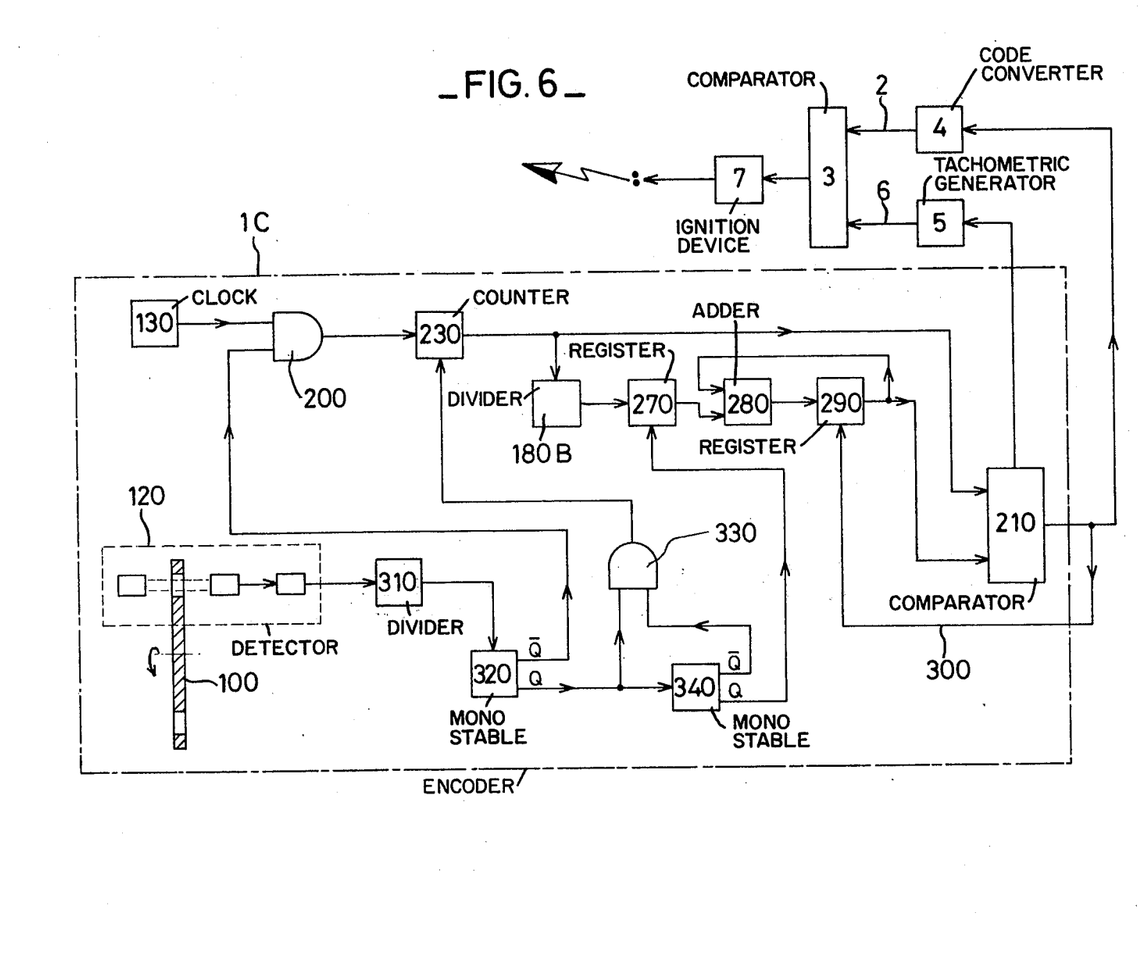
FIG. 6 shows schematically a first variation of the second embodiment, in which variation a divider divides in two the successive signals from the position detector.
Figure 7:
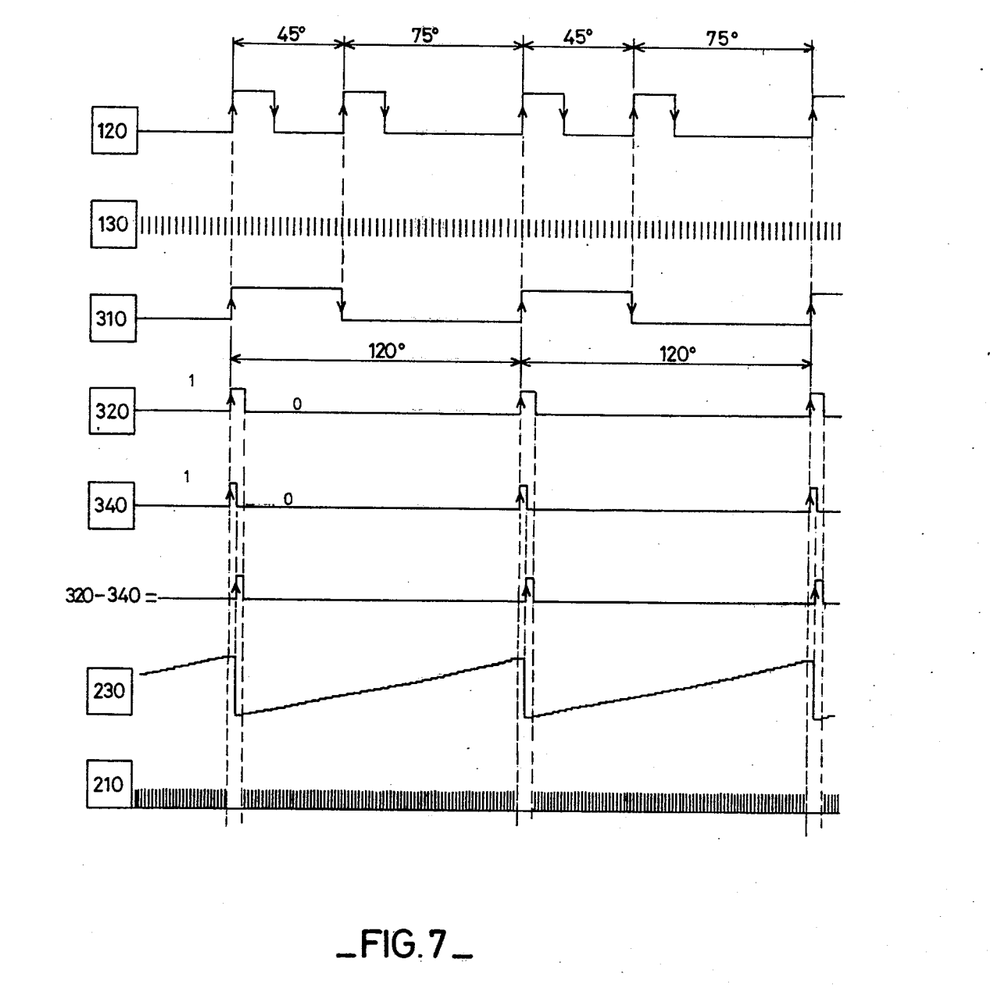
FIG. 7 shows the analogue form of the functions obtained by the device of FIG. 6 for a constant speed.

FIG. 6 represents a first variation of the second embodiment of the angular coder, in which variation a divider 310 transforms two successive signals from the position detector 120 (see FIG. 7) into a rectangular signal. A first monostable device 320, of which the state 1 is caused by the ascending front of the divider 310, controls by its output $\overline{Q}$ the finish of counting of the counter 230 by means of the AND gate 330. A second monostable device 340, of which the state 1 is caused by the state 1 of the monostable device 320 has a time constant less than that of the monostable device 320 so that by subtraction of the time constant of the monostable device 340, there is obtained a signal for the return to zero of the counter 230 (see FIG. 7).

The output Q of the monostable device 340 controls the recordal in the memory register 270 of the number N3 of pulses from the binary divider 180B. This number N3 is the quotient of the division by N2 which, in this embodiment, is equal to 128, of the number N1 of pulses from the generator 130 during one part of the signal from the divider 310 (see FIG. 7). The signal from the divider 310 has, in this embodiment, an angular value equal to 120°, which value corresponds to two successive ascending fronts of the divider 310. The division by 128 of the angular value equal to 120° thus enables a train of pulses to be obtained at the output of the comparator 210, which, except at the time constant of the monostable device 320, is practically permanent, the pulses being displaced one from another by an angular value slightly less than a degree.

Figure 8:
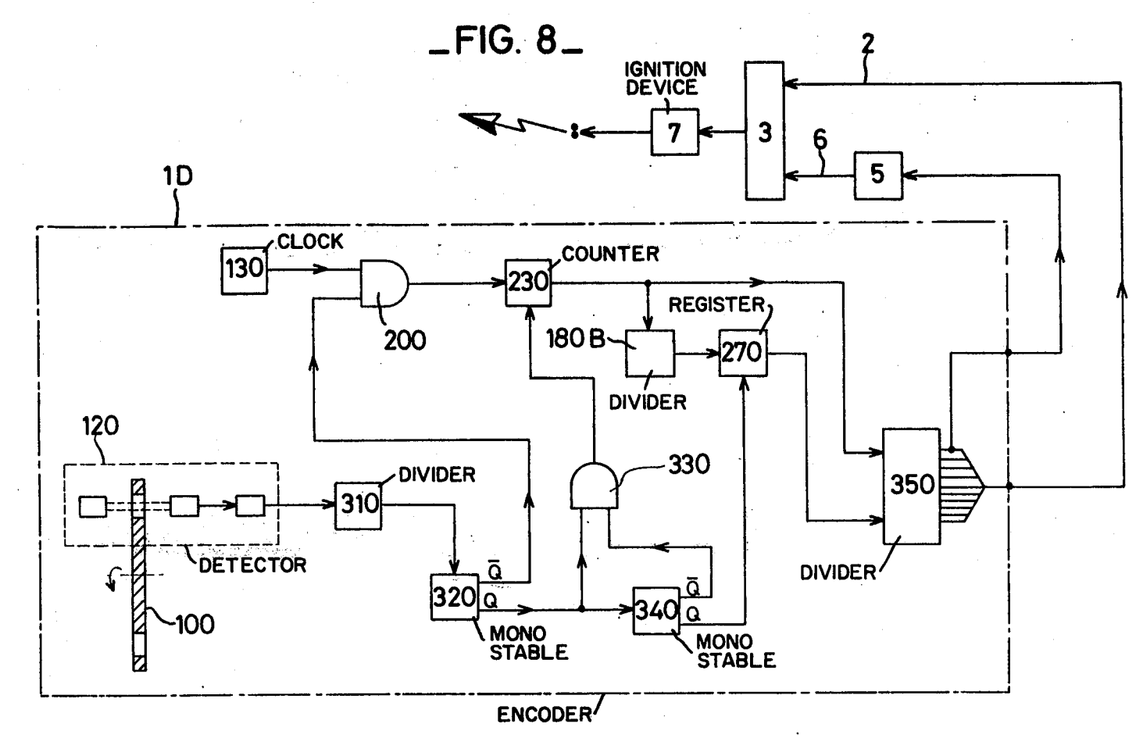
FIG. 8 shows schematically a second variation of the second embodiment in which the comparator is replaced by a binary divider.
Figure 9:
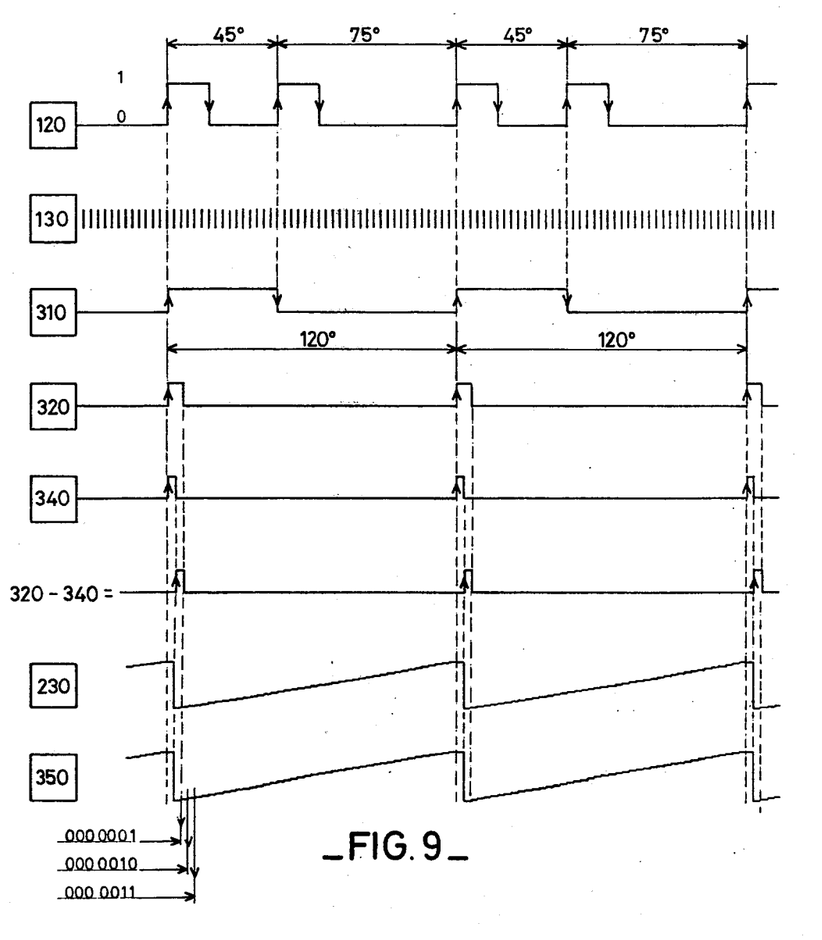
FIG. 9 shows the analogue form of the functions obtained by the device of FIG. 8 for a constant speed.

FIG. 8 represents schematically a second variation of the second embodiment of the angular coder, in which embodiment the comparator 210 is replaced by a binary divider 350 and in which the adder 280 and the memory register 290 are omitted. This binary divider 350 effects the division of the number N1 from the counter 230 by the number N3 from the memory register 270 so that at the output of the divider 350 (see FIG. 9) there is obtained a binary number corresponding to a determined value of displacement with respect to the previously obtained number, which binary number corresponds to the displacement value and is applied directly to one of the inputs of the comparator 3 which triggers the ignition signal.

In this embodiment, the tachometric generator is controlled by the pulses present on the last "bit" of the divider 350.

Figures 10, 12:
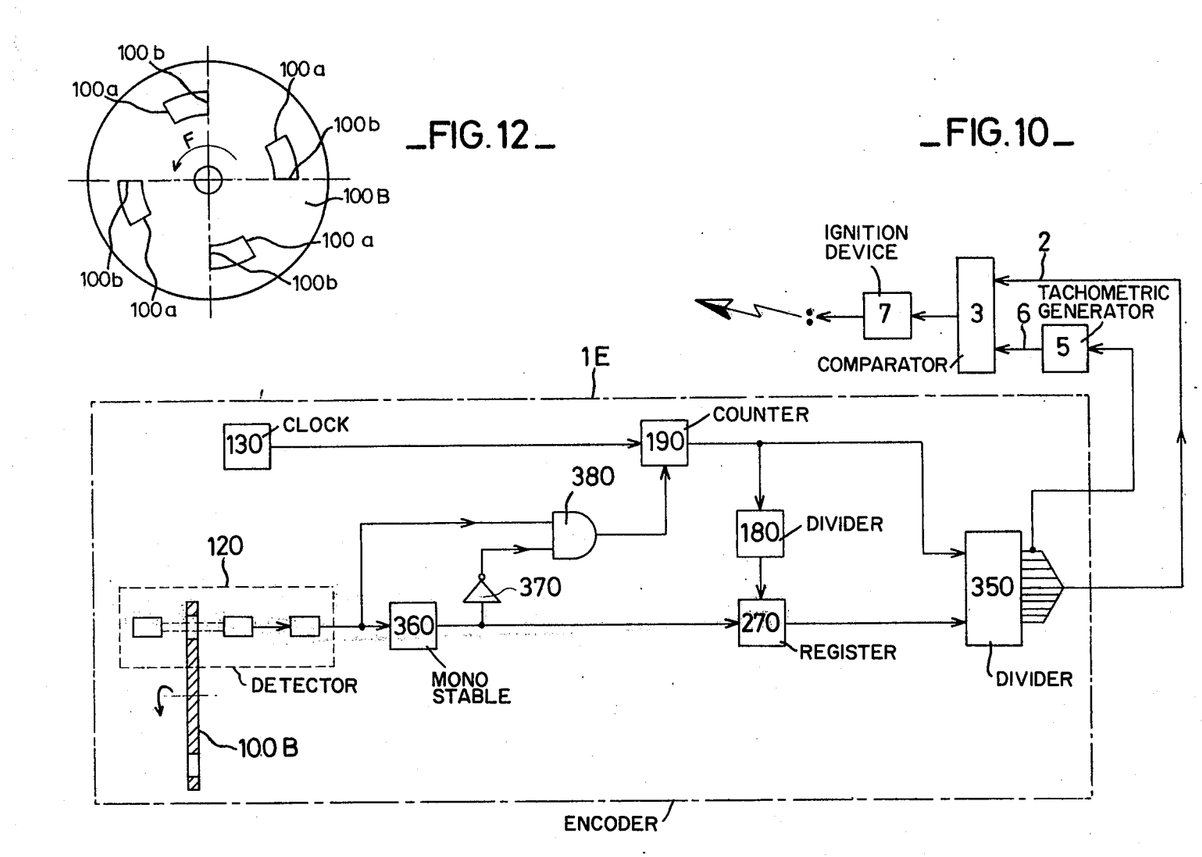
FIG. 10 shows schematically a third embodiment adapted particularly to a multi-cylinder symmetrical engine.
FIG. 12 is a schematic view of the rotatable disc associated with the device of FIG. 10.

FIG. 10 shows schematically a third embodiment of the angular coder, which is particularly adapted to a multi-cylinder symmetrical engine. A rotatable disc 100B (see FIG. 12) driven in the direction of the arrow F at half the speed of the internal combustion engine (not shown), includes four openings angularly spaced by 90° and is associated with the position detector 120. The angular width of the openings, identical for all of the openings, corresponds to the desired variation of advance, which variation is determined by the side 100a for maximum advance and 100b for minimum advance (see FIG. 12).

Figure 11:
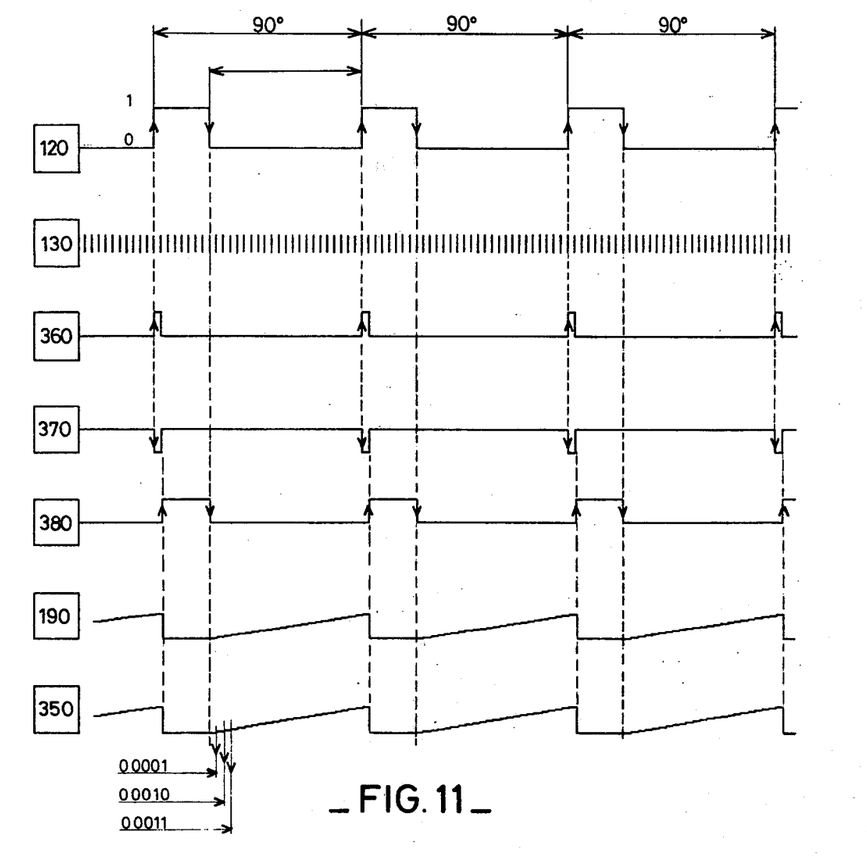
FIG. 11 shows the analogue form of the functions obtained by the device of FIG. 10.

The position detector 120 delivers a rectangular reference signal of which the state 1 (see FIG. 11) corresponds to the width of one of the openings. As soon as the position detector 120 returns to the state 0, and for the whole duration of this state, a counter 190 counts the number N1 of pulses from the constant frequency pulse generator 130. When the signal of the position detector 120 returns once more to the state 1, the number N1 of pulses counted by the counter is divided in a first binary divider 180 by a number N2, which in this embodiment is equal to 32, which value represents the angular width of the openings of the disc 100B.

The number N3 from the binary divider 180 and corresponding to the number of pulses per degree, is memorised in a memory register 270 during a period determined by the time constant of a monostable device 360 which is triggered by the ascending front of the reference signal from the position detector 120.

An inverter 370 of the state of the monostable device 360, and an AND gate 380, control, by means of the ascending front of the signal from the AND gate 380, the finish of counting and the return to zero of the counter 190. The commencement of counting is controlled by the descending front of the signal from the AND gate 380.

The second binary divider 350 effects the division of the number N1 from the counter 190 by the number N3 from the memory register 270 in such a manner that at the output of the divider 350 (see FIG. 11) there is obtained a binary number corresponding to a determined value of displacement with respect to the number previously obtained.

The tachometric generator 5 is controlled by the pulses present on the last "bit" of the divider 350.

The functions carried out by the memory registers provided in the previously described embodiments have not been shown on FIGS. 5, 7, 9 and 11, since they are well known to a person skilled in the art and it did not appear necessary for a proper understanding of the invention to provide a representation thereof.

In all the embodiments described, the precision obtained is a function of the frequency of the generator 130. This frequency is calculated so that at the maximum speed of the engine, the precision is of one second of arc per degree of arc, i.e. for an engine rotating at 12,000 revs/min, the frequency must be 2.16 MHz.

Figure 13:
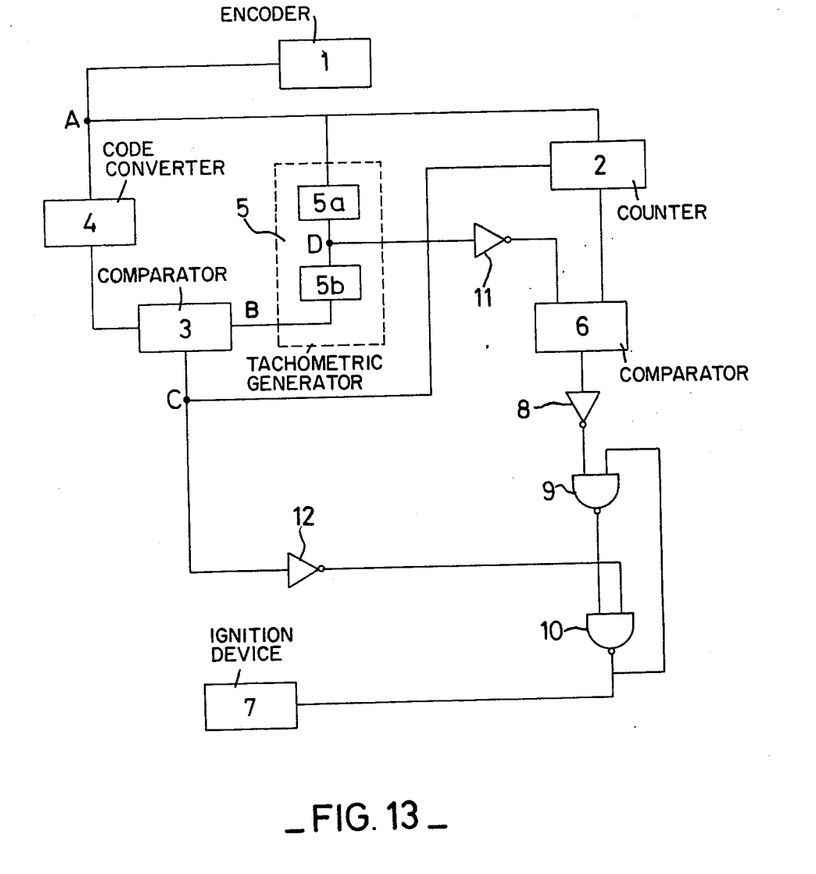
FIG. 13 is the schematic representation of a preferred embodiment of an ignition device conforming to the second object of the invention.

In FIG. 13, the automatic ignition advance device includes, in known manner, an angular coder 1, a code converter 4, a comparator 3, a tachometric generator 5 constituted by bistable devices 5a delivering a binary number B and programmed matrix systems 5b, and an ignition device 7.

In accordance with the second object of the invention, a device for controlling the charge of the coil is added to the automatic ignition advance and is essentially constituted by a counter 2, a comparator 6, an inverter 11 and a bistable device composed of two NO-AND gates 9 and 10 and two inverters 8 and 12.

The counter 2 receives information signals from a point A at the output of the angular coder 1 and its return to zero is determined by the instant of ignition defined at the point C by the signal emitted by the comparator 3.

The comparator 6 receives at one of its inputs the binary number complementary to the binary number B appearing at D by means of the inverter 11 and at its other input the binary number delivered by the counter 2.

The signal from the comparator 6 is inverted in order to arrive at one input of the NO-AND gate 9, which receives at its other input the output signal of the NO-AND gate 10, which gate 10 receives at one of its inputs the output signal of the gate 9 and at its other input the signal from the point C defining the instant of ignition.

Figure 14:
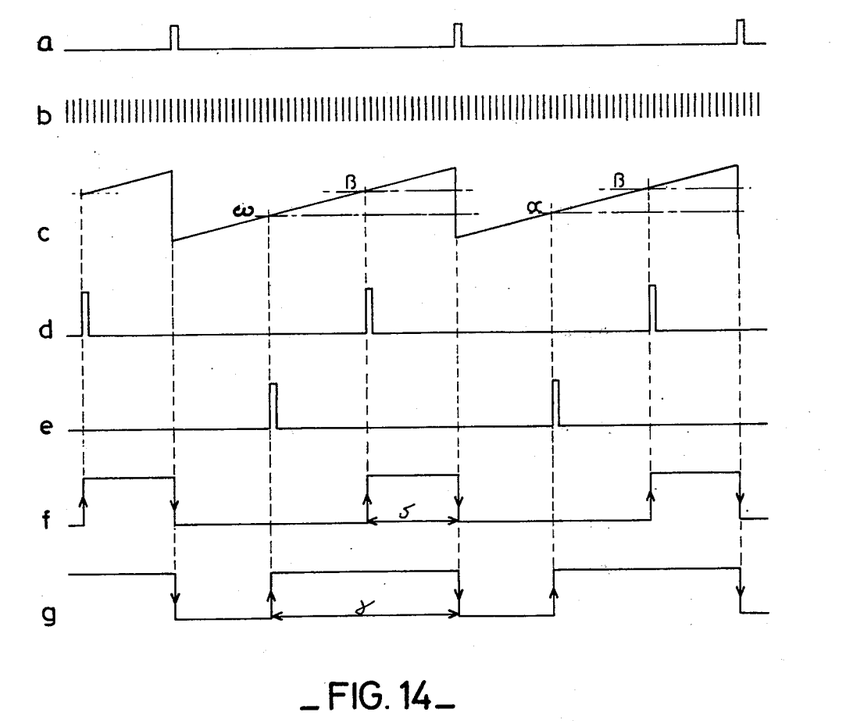
FIG. 14 is the graphic representation of the signals obtained at various points in the device of FIG. 13.

The operation of such a device is as follows: Starting from the ignition signal (FIG. 14a) at the output of the comparator 3 of the automatic advance, the counter 2 includes the pulses (FIG. 14b) from the angular coder 1. The comparator 6 delivers a pulse when the binary number present at the output of the counter 2 is identical with the inverse of the number stored in the bistable devices 5a of the digital advance (FIG. 14d) at low speed, (FIG. 14e) at high speed. In effect, there is memorised in the bi-stable devices a number proportional to the speed of rotation of the engine. The higher the speed, the greater will be the number memorised in the bi-stable devices 5a and the smaller will be the inverse (FIG. 14g) and therefore the nearer the pulse at the output of the comparator 6 will become to the previous ignition pulse. The time separating it from the following ignition pulse will be practically constant.

In the case of low speeds, the inverse of the number memorised in the bistable devices 5a is represented by FIG. 14g.

At the output of the comparator 3 and of the comparator 6, the bistable device constituted by the inverters 8 and 12 and the NO-AND gates 9 and 10 forms a signal of which the ascending front (represented by a rising arrow in FIG. 14f for slow speeds and 14g for high speeds) defines the point at which the ignition coil commences to charge, and of which the descending front (represented by a descending arrow in FIGS. 14f and 14g) defines the instant of ignition.

It will be noted that a low speed the coil charges during a period δ and at high speed during a period γ, which, contrary to the drawing where the ignition pulses (FIG. 14a) are equidistant whatever the speed, represents a substantially constant duration whatever the speed of rotation of the engine and gives especially an optimum charge time for the coil.

It is well understood that numerous modifications can be made to this embodiment without departing from the scope of the invention. In effect, in an asymmetrical engine, the system will necessarily be duplicated, since the times separating two successive ignitions are not constant.

I claim:

1. An internal combustion engine ignition system comprising an ignition coil periodically supplied with current, a spark circuit connected to the coil so that a spark is generated thereby each time the current in the ignition coil is interrupted, an angular position detecting means providing a digital output varying in accordance with displacement of the engine shaft beyond a datum position, a tachometric generator producing a digital output representing the engine shaft speed, ignition control means responsive to the digital signals from the angular position detecting means and the tachometric generator determining the instant of cessation of current flow in said coil in accordance with a predetermined ignition advance law, and coil current control means responsive to the digital signal from the tachometric generator and to the output of said ignition control means for determining when current flow in the coil is recommenced following each spark.

2. An internal combustion engine ignition system according to claim 1 wherein the coil current control means comprises a counter which receives signals from an encoder and is reset by a pulse from a comparator and converts said signals into a binary number received by a second comparator which at the same time receives the compliment of the binary number arriving at an automatic advance matrix memory device, which second comparator includes at its output a bi-stable device which receives the information signals on the one hand through the second comparator which determines the start of charging of the admission coil and on the other hand through a digital advance comparator which determines the instant of ignition.

* * * * *